(12) United States Patent
Leijon

(10) Patent No.: US 6,798,107 B2
(45) Date of Patent: Sep. 28, 2004

(54) ROTATING ELECTRIC MACHINES WITH MAGNETIC CIRCUIT FOR HIGH VOLTAGE AND METHOD FOR MANUFACTURING THE SAME

(75) Inventor: Mats Leijon, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/603,802

(22) Filed: Jun. 26, 2003

(65) Prior Publication Data

US 2004/0084987 A1 May 6, 2004

Related U.S. Application Data

(63) Continuation of application No. 08/973,019, filed as application No. PCT/SE97/00874 on May 27, 1997.

(30) Foreign Application Priority Data

May 29, 1996 (SE) .............................................. 9602079

(51) Int. Cl.[7] .............................. H02K 3/40; H02K 3/12
(52) U.S. Cl. ....................... 310/196; 310/179; 310/180; 310/195; 174/DIG. 20; 174/DIG. 28
(58) Field of Search ................................. 310/179, 180, 310/184, 195–196, 198–208, 213; 290/1 R; 174/DIG. 13–33

(56) References Cited

U.S. PATENT DOCUMENTS 1,891,716 A * 12/1932 Laffoon ....................... 310/196
4,308,476 A * 12/1981 Schuler ........................ 310/45

OTHER PUBLICATIONS

Parsons et al., "Direct Generation of Alternating Currents at High Voltages", Journal IEEE, V67 n393, Sep. 1929.*

Rosen, "Generation at 33 kV Proved by Performance", Electrical World, May 6, 1933.*

Parsons, "Corona Discharge on Alternators", Electrical Times, Apr. 4, 1935.*

"Development of High Voltage Generators", Electrical Times, v83, n2153, Jan. 26, 1933.*

Friedlaender, "Travelling Waves in High Voltage Alternator Windings", Journal of the Institution of Electrical Engineers, v89, pt. (Power Eng) n 11, Oct. 1942, p. 492–508.*

Horsley, "Operating Experience with High–Voltage Alternators", Journal of the Institution of Electrical Engineers, v87 No. 528, Dec. 1940, p. 679–686.*

* cited by examiner

Primary Examiner—Burton Mullins
(74) Attorney, Agent, or Firm—Dykema Gossett PLLC

(57) ABSTRACT

A rotating electric machine for direct connection to all types of high-voltage networks, in which the magnetic circuit adapted for high voltage comprises a rotor, stator and windings. The winding comprising a conductor surrounded by a solid insulation system. The invention also relates to a method for manufacturing the same.

36 Claims, 1 Drawing Sheet

ROTATING ELECTRIC MACHINES WITH MAGNETIC CIRCUIT FOR HIGH VOLTAGE AND METHOD FOR MANUFACTURING THE SAME

This application is a continuation of Ser. No. 08/973,019 filed on Apr. 3, 1998, which is a 317 of PCT/SE97/00874 filed on May 27, 1997.

TECHNICAL FIELD

The invention relates to a rotating electric machine comprising a magnetic circuit with a magnetic core and a winding. Such electric machines comprise synchronous machines which are mainly used as generators for connection to distribution and transmission networks; commonly referred to below as power networks. The synchronous machines are also used as motors and for phase compensation and voltage control, in that case as mechanically idling machines. The technical field also comprises double-fed machines, asynchronous machines, asynchronous converter cascades, outer pole machines and synchronous flux machines.

The magnetic circuit referred to in this context comprises a magnetic core of laminated, normal or oriented, sheet or other, for example amorphous or powder-based, material, or any other action for the purpose of allowing an alternating flux, a winding, a cooling system, etc., and may be located in either the stator or the rotor of the machine, or in both.

The invention also comprises a method for manufacturing a magnetic circuit for a rotating electric machine.

BACKGROUND ART THE PROBLEM

In order to explain and describe the machine, a brief description of a rotating electric machine will first be given, exemplified on the basis of a synchronous machine. The first part of the description substantially relates to the magnetic circuit of such a machine and how it is constructed according to classical technique. Since the magnetic circuit referred to in most cases is located in the stator, the magnetic circuit below will normally be described as a stator with a laminated core, the winding of which will be referred to as a stator winding, and the slots in the laminated core for the winding will be referred to as stator slots or simply slots.

Most synchronous machines have a field winding in the rotor, where the main flux is generated by de, and an ac winding which is in the stator. The synchronous machines are normally of three-phase design. Sometimes, the synchronous machines are designed with salient poles. The latter have an ac winding in the rotor.

The stator body for large synchronous machines are often made of sheet steel with a welded construction. The laminated core is normally made from varnished 0.35- or 0.5 mm electric sheet. For larger machines, the sheet is punched into segments which are attached to the stator body by means of wedges/dovetails. The laminated core is retained by pressure fingers and pressure plates.

For cooling of the windings of the synchronous machine, three different cooling systems are available.

In case of air cooling, both the stator winding and the rotor winding are cooled by cooling air flowing through. The cooling air ducts are to be found both in the stator laminations and in the rotor. For radial ventilation and cooling by means of air, the sheet iron core at least for medium-sized and large machines is divided into stacks with radial and axial ventilation ducts disposed in the core. The cooling air may consist of ambient air but at powers exceeding 1 MW, a closed cooling is substantially used.

Hydrogen cooling is normally used in turbogenerators up to about 400 MW and in large synchronous condensers. The cooling method functions in the same way as in air cooling with heat exchangers, but instead of air as coolant hydrogen gas is used. The hydrogen gas has better cooling capacity than air, but difficulties arise at seals and in monitoring leakage. For turbogenerators in the power range of 500–1000 MW, it is known to apply water cooling of both the stator winding and the rotor winding. The cooling ducts are in the form of tubes which are placed inside conductors in the stator winding.

One problem with large machines is that the cooling tends to become non-uniform and that, therefore, temperature differences arise across the machine The stator winding is located in slots in the sheet iron core, the slots normally having a rectangular or a trapezoidal cross section. Each winding phase comprises a number of coil groups connected in series and each coil group comprises a number of coils connected in series. The different parts of the coil arc designated coil side for the part which is placed in the stator and end winding for that part which is located outside the stator. A coil comprises one or more conductors brought together in height and/or width.

Between each conductor there is a thin insulation, for example epoxy/glass fibre.

The coil is insulated from the slot with a coil insulation, that is, an insulation intended to withstand the rated voltage of the machine to earth. As insulating material, various plastic, varnish and glass fibre materials may be used. Usually, so-called mica tape is used, which is a mixture of mica and hard plastic, especially produced to provide resistance to partial discharges, which can rapidly break down the insulation. The insulation is applied to the coil by winding the mica tape around the coil in several layers. The insulation is impregnated, and then the coil side is painted with a graphite based paint to improve the contact with the surrounding stator which is connected to earth potential.

The conductor area of the windings is determined by the current intensity in question and by the cooling method used. The conductor and the coil are usually formed with a rectangular shape to maximize the amount of conductor material in the slot. A typical coil is formed of so-called Roebel bars, in which certain of the bars may be made hollow for a coolant. A Roebel bar comprises a plurality of rectangular, copper conductors connected in parallel, which are transposed 360. degrees along the slot. Ringland bars with transpositions of 540 degrees and other transpositions also occur. The transposition is made to avoid the occurrence of circulating currents which arc generated in a cross section of the conductor material, as viewed from the magnetic field.

For mechanical and electrical reasons, a machine cannot be made in just any size. The machine power is determined substantially by three factors. The conductor area of the windings. At normal operating temperature, copper, for example, has a maximum value of 33.5 A/mm2. The maximum flux density (magnetic flux) in the stator and rotor material. The maximum electric field strength in the insulating material, the so-called dielectric strength.

Polyphase ac windings are designed either as single-layer or two-layer windings. In the case of single-layer windings, there is only one coil side per slot, and in the case of two-layer windings there are two coil sides per slot. Two layer windings are usually designed as diamond windings, whereas the single-layer windings which are relevant in this connection may be designed as a diamond winding or as a concentric winding. In the case of a diamond winding, only one coil span (or possibly two coil spans) occurs, whereas flat windings are designed as concentric windings, that is, with a greatly varying coil span. By coil span is meant the distance in circular measure between two coil sides belonging to the same coil, either in relation to the relevant pole pitch or in the number of intermediate slot pitches. Usually, different variants of chording are used, for example short-pithing, to give the winding the desired properties.

The type of winding substantially describes how the coils in the slots, that is, the coil sides, are connected together outside the stator, that is, at the end windings.

Outside the stacked sheets of the stator, the coil is not provided with a painted semiconducting ground-potential layer. The end winding is normally provided with an E-field control in the form of so-called corona protection varnish intended to convert a radial field into an axial field, which means that the insulation on the end windings occurs at a high potential relative to earth. This sometimes gives rise to corona in the coil-end region, which may be destructive. The so-called field-controlling points at the end windings entail problems for a rotating electric machine.

Normally, all large machines are designed with a two-layer winding and equally large coils. Each coil is placed with one side in one of the layers and the other side in the other layer. This means that all the coils cross each other in the end winding. If more than two layers are used, these crossings render the winding work difficult and deteriorate the end winding.

It is generally known that the connection of a synchronous machine/generator to a power network must be made via a IE/Dconnected so-called step-up transformer, since the voltage of the power network normally lies at a higher level than the voltage of the rotating electric machine. Together with the synchronous machine, this transformer thus constitutes integrated parts of a plant. The transformer constitutes an extra cost and also has the disadvantage that the total efficiency of the system is lowered. If it were possible to manufacture machines for considerably higher voltages, the step-up transformer could thus be omitted.

During the last few decades, there have been increasing requirements for rotating electric machines for higher voltages than for what has previously been possible to design. The maximum voltage level which, according to the state of the art, has been possible to achieve for synchronous machines with a good yield in the coil production is around 25–30 kV.

Certain attempts to a new approach as regards the design of synchronous machines are described, inter alia, in-an article entitled "Water-and-oil-cooled Turbogenerator TVM300" in J. Elektrotechnika, No. 1, 1970, pp. 6–8, in U.S. Pat. No. 4,429,244 "Stator of Generator" and in Russian patent document CCCP Patent 955369.

The water- and oil-cooled synchronous machine described in J. Elektrotechnika is intended for voltages up to 20 kV. The article describes a new insulation system consisting of oil/paper insulation, which makes it possible to immerse the stator completely in oil. The oil can then be used as a coolant while at the same time using it as insulation. To prevent oil in the stator from leaking out towards the rotor, a dielectric oil-separating ring is provided at the internal surface of the core. The stator winding is made from conductors with an oval hollow shape provided with oil and paper insulation. The coil sides with their insulation are secured to the slots made with rectangular cross section by means of wedges. As coolant, oil is used both in the hollow conductors and in holes in the stator walls. Such cooling systems, however, entail a large number of connections of both oil and electricit,r at the coil ends. The thick insulation also entails an increased radius of curvature of the conductors, which in turn results in an increased size of the winding overhang.

The above-mentioned US patent relates to the stator part of a synchronous machine which comprises a magnetic core of laminated sheet with trapezoidal slots for the stator winding. The slots are tapered since the need of insulation of the stator winding is less towards the rotor where that part of the winding which is located nearest the neutral point is located. In addition, the stator part comprises a dielectric oil-separating cylinder nearest the inner surface of the core. This part may increase the magnetization requirement relative to a machine without this ring. The stator winding is made of oil-immersed cables with the same diameter for each coil layer. The layers are separated from each other by means of spacers in the slots and secured by wedges. What is special for the winding is that it comprises two so-called half-windings connected in series. One of the two half-windings is located, centered, inside an insulating sleeve. The conductors of the stator winding are cooled by surrounding oil. Disadvantages with such a large quantity of oil in the system are the risk of leakage and the considerable amount of cleaning work which may result from a fault condition. Those parts of the insulating sleeve which are located outside the slots have a cylindrical part and a conical termination reinforced with current-carrying layers, the purpose of which is to control the electric field strength in the region where the cable enters the end winding.

From CCCP 955369 it is clear, in another attempt to raise the rated voltage of the synchronous machine, that the oil cooled stator winding comprises a conventional high-voltage cable with the same dimension for all the layers. The cable is placed in stator slots formed as circular, radially located openings corresponding to the cross-section area of the cable and the necessary space for fixing and for coolant. The different radially located layers of the winding are surrounded by and fixed in insulating tubes. Insulating spacers fix the tubes in the stator slot. Because of the oil cooling, an internal dielectric ring is also needed here for sealing the oil coolant off against the internal air gap. The disadvantages of oil in the system described above also apply to this design. The design also exhibits a very narrow radial waist between the different stator slots, which implies a large slot leakage flux which significantly influences the magnetization requirement of the machine.

A report from Electric Power Research Institute, EPRI, EL3391, from 1984 describes a review of machine concepts for achieving a higher voltage of a rotating electric machine for the purpose of being able to connect a machine to a power network without an intermediate transformer. Such a solution judging from the investigation to provide good efficiency gains and great economic advantages. The main reason for considering it in 1984 to start developing generators for direct connection to power networks was that at the time a superconducting rotor had been produced. The large magnetization capacity of the superconducting field makes it possible to use an air gap winding with a sufficient insulation thickness to withstand the electrical stresses. By combining the most promising concept, according to the project, of designing a magnetic circuit with a winding, a so-called monolith cylinder armature, a concept where the winding comprises two cylinders of conductors concentrically enclosed in three cylindrical insulating casings and the whole structure being fixed to an iron core without teeth, it was judged that a rotating electric machine for high voltage could be directly connected to a power network. The solution meant that the main insulation had to be made sufficiently thick to cope with network-to-network and network-to-earth potentials. The insulation system which, after z review of all the technique known at the time, was judged to be necessary to manage an increase to a higher voltage was that which is normally used for power transformers and which consists of dielectric-fluid impregnated cellulose pressboard. Obvious disadvantages with the proposed solution are that, in addition to requiring a superconducting rotor, it requires a very thick insulation which increases the size of the machine. The end windings must be insulated and cooled with oil or f reons to control the large electric fields in the ends. The whole machine must be hermetically enclosed to prevent the liquid dielectric from absorbing moisture from the atmosphere.

During the decades around 1930 a few generators with high voltages up to 36 kV were built, in order to develop a generator for direct connection to power networks. One project was based on using conductors of concentric type, with three layers of conductors enclosed in insulation, where each layer was connected in series and the inner layer was at the highest potential. In another version the electrical conductors were made of twisted copper strips that were isolated with special layers of mica, varnish and paper.

When manufacturing rotating electric machines according to the state of the art, the winding is manufactured with conductors and insulation systems in several steps, whereby the winding must be preformed prior to mounting on the magnetic circuit. Impregnation for preparing the insulation system is performed after mounting of the winding on the magnetic circuit.

SUMMARY OF THE INVENTION ADVANTAGES

The object of the invention is to obtain a rotating electric machine with such a high voltage that the 0/Y-connected step-up transformer mentioned above can be omitted, that is, machines with a considerably higher voltage than machines according to the state of the art to be able to perform direct connection to power networks. This means considerably lower investment costs for systems with a rotating electric machine and the total efficiency of the system can be increased. The rotating electric machine can be connected to a power network with a minimum of connecting devices such as circuit breakers, disconnectors or the like. In a system with a rotating machine directly connected to a power network without an intermediate transformer the connection can be made using only one circuit breaker.

A rotating electric machine according to the invention entails a considerably reduced thermal stress on the stator. Temporary overloads of the machine thus become less critical and it will be possible to drive the machine at overload for a longer period of time without running the risk of damage arising. This means considerable advantages for owners of power generating plants who are forced presently, in case of operational disturbances, to rapidly switch to other equipment in order to ensure the delivery requirements laid down by law.

With a rotating electric machine according to the invention, the maintenance costs can be significantly reduced because transformers and circuit breakers do not have to be included in the system for connecting the machine to the power network.

It is another object of the invention to achieve a synchronous compensator which is directly connected to the power network.

It is an additional object of the invention to be able to manufacture a rotating electric machine for high voltage without any complicated performing of the winding and without having to impregnate the insulation system after mounting of the winding.

To increase the power of a rotating electric machine, it is known that the current in the ac coils should be increased. This has been achieved by optimizing the quantity of conducting material, that is, by close-packing of rectangular conductors in the rectangular rotor slots. The aim was to handle the increase in temperature resulting from this by increasing the quantity of insulating material and using more temperature-resistant and hence more expensive insulating materials. The high temperature and field load on the insulation has also caused problems with the life of the insulation. In the relatively thick-walled insulating layers which are used for high-voltage equipment, for example impregnated layers of mica tape, partial discharges, PD, constitute a serious problem. When manufacturing these insulating layers, cavities, pores, and the like, will easily arise, in which internal corona discharges arise when the insulation is subjected to high electric field strengths. These corona discharges gradually degrade the material and may lead to electric breakdown through the insulation.

The present invention is based on the realization that, an increase in power of a rotating electrical machine in a technically and economically justifiable way, is achieved by ensuring that the insulation is not broken down by the phenomena described above. This can be achieved according to the invention by using as insulation layers made in such a way that the risk of cavities and pores is minimal, for example extruded layers of a suitable solid insulating material, such as thermoplastic resins, crosslinked thermoplastic resins, rubber such as silicone rubber or EP rubber, etc. In addition, it is important that the insulating layer comprises an inner layer, surrounding the conductor, with semiconducting properties and that the insulation is also provided with at least one additional outer layer, surrounding the insulation, with semiconducting properties. The inner semiconducting layer shall function in such a way as to even the potential of the electric field outside the inner layer and the outer layer shall on one part function in such a way as to evening the potential by connecting it to a selected potential and on the other part by enclosing the electric field around the conductors within the outer layer. Semiconducting properties in this context is a material which has a considerably lower conductivity than an electric conductor but which does not have such a low conductivity that it is an insulator. For example, the inner and outer semiconducting layers may have a resistivity within the interval 10–6 f2cm–100 kg2cm. By using only insulating layers which may be manufactured with a minimum of defects and, in addition, providing the insulation with an inner and an outer semiconducting layer, it can be ensured that the thermal and electric loads are reduced. The insulating part and the semiconducting layers should adhere along essentially the whole of its contact surfaces. Further, the adjoining layers should have essentially the same coefficient of thermal expansion. At temperature gradients, defects caused by different temperature expansion in the insulation and the surrounding layers should not arise. The electric load on the material decreases as a consequence of the fact that the semiconducting layers around the insulation will constitute equipotential surfaces and that the electrical field in the insulating part will be distributed relatively evenly over the thickness of the insulation. The outer semiconducting layer may be connected to a chosen potential, for example earth potential. This means that, for such a cable, the outer casing of the winding in its entire length may be kept at, for example, earth potential. The outer layer may also be cut off at suitable locations along the length of the conductor and each cut-off partial length may be directly connected to a chosen potential. Around the outer semiconducting layer there may also be arranged other layers, casings and the like, such as a metal shield and a protective sheath.

Other knowledge gained in connection with the present invention is that increased voltage load leads to problems with electric (E) field concentrations at the corners at a cross section of a coil and that this entails large local loads on the insulation there. Likewise, the magnetic (B) field in the teeth of the stator will, in the case of increased current load, be concentrated at the corners. This means that magnetic saturation arises locally and that the magnetic core is not utilized in full and that the waveform of the generated voltage/current will be distorted. In addition, eddy-current losses caused by induced eddy currents in the conductors, which arise because of the geometry of the conductors in relation to the B field, will entail additional disadvantages in increasing current densities. A further improvement of the invention is achieved by making the coils and the slots in which the coils are placed essentially circular instead of rectangular. By making the cross section of the coils circular, these will be surrounded by a constant B field without concentrations where magnetic saturation may arise. Also the E field in the coil will be distributed evenly over the cross section and local loads on the insulation are considerably reduced. In addition, it is easier to place circular coils in slots in such a way that the number of coil sides per coil group may increase and an increase of the voltage may take place without the current in the conductors having to be increased. The reason for this being that the cooling of the conductors is facilitated by, on the one hapd, a lower current density and hence lower temperature gradients across the insulation and, on the other hand, by the circular shape of the slots which entails a more uniform temperature distribution over a cross section. Additional improvements may also be achieved by composing the conductor from smaller parts, so-called strands. The strands may be insulated from each other and only a small number of strands may be left uninsulated and in contact with the inner semiconducting layer, to ensure that this is at the same potential as the conductor.

An advantage a of using a rotating electric machine according to the invention is that the machine can be operated at overload for a considerably longer period of time than what is usual for such machines without being damaged. This is a consequence of the design of the machine and the limited thermal load of the insulation. It is, for example, possible to load the machine with up to 100% overload for a period exceeding 15 minutes and up to two hours.

As synchronous compensators there are used, inter alia, synchronous motors without a connected mechanical load. By adapting the magnetization, the synchronous condenser may give either inductive or capacitive kVA. When the compensator is connected to a power network, it may compensate for inductive or capacitive load on the network within an interval. Since the synchronous compensator must be connected to certain power networks with voltages exceeding about 20 kV via a transformer, the range of the synchronous compensator within which it may provide the network with reactive power is influenced by the fact that the reactance of the transformer limits the angle of lag between current and voltage. With a rotating electric machine according to the invention, it is possible to design a synchronous compensator which may be connected to a power network without an intermediate transformer and which may be operated with a chosen under- or over-excitation to compensate for inductive or capacitive loads on the network.

The rotating electric machine according to the invention can be connected to one or more system voltage levels. This is possible due to that the electric field outside the machine can be kept at a minimum.

The connection to different system voltage levels, can be provided by having separate tappings on one winding or by having a separate winding for the connections to different system voltage levels or by combinations of these arrangements.

One embodiment according to the invention is that the magnetic circuit of the rotating electric machine comprises a winding of a threaded cable with one or more extruded insulated conductors with solid insulation with a semiconducting layer both at the conductor and the casing. The outer semiconducting layer may be connected to ground potential. To be able to cope with the problems which arise in case of direct connection of rotating electric machines to all types of high-voltage power networks, a machine according to the invention has a number of features which distinguish it from the state of the art.

As described above, a winding for a rotating electric machine may be manufactured from a cable with one or more extruded insulated conductors with a semiconducting layer both at the conductor and at the casing. Some typical examples are thermoplastic resins or crosslinked thermo plastic resins such as for example XLPE cable or a cable with insulation of rubber such as silicorie rubber or EP rubber, conductor may be composed of strands. It is possible to insulate the strands with respect to each other in order thus to reduce the amount of eddy current losses in the conductor. One or a few strands shall be left uninsulated to ensure that the semiconducting layer which surrounds the conductor is at the same potential as the conductor.

It is known that a high-voltage cable for transmission of electric energy is composed of conductors with solid insulation with an inner and an outer semiconductor part. In the process of transmitting electric energy it is required that the insulation should be free from defects. When using high-voltage cables for transmission of electric energy, the aim was been to maximize the current through the cable since space is no limitation for a transmission cable. Insulation of a conductor for a rotating electric machine may be applied in some other way than by means of extrusion, for example by spraying, figure moulding, compression moulding, injection moulding or the like. It is important, however, that the insulation should have no defects through the whole cross section and should possess similar thermal properties. The semiconducting layers may be supplied with the insulation in connection with the insulation being applied to the conductors. The semiconducting layers may be composed of a polymer comprising an electrically conductive element.

Preferably, cables with a circular cross section are used. Among other things, to obtain a better packing density, cables with a different cross section may be used. To build up a voltage in the rotating electric machine, the cable is arranged in several consecutive turns in slots in the magnetic core. The winding can be designed as a multi-layer concentric cable winding to reduce the number of end winding crossings. The cable may be made with tapered insulation to utilize the magnetic core in a better way, in which case the shape of the slots may be adapted to the tapered insulation of the winding.

A significant advantage of a rotating electrical machine according to the invention is that the E field is near zero in the end winding region outside the outer semiconductor and that with the outer casing at earth potential, the electric field need not be controlled. This means that no field concentrations can be obtained, neither within sheets, in end winding regions or in the transition in between.

The present invention also relates to a method for manufacturing the magnetic circuit and, in particular, the winding. The method for manufacturing comprises placing the winding in the slots by threading a cable into the openings in the slots in the magnetic core. Since the cable is flexible, it' can be bent and this permits a cable length to be located in several turns in a coil. The end windings will then consist of bending zones in the cables. The cable may also be joined in such a way that its properties remain constant over the cable length. This method entails considerable simplifications compared with the state of the art. The so called Rocbel bars are not flexible but must be preformed into the desired shape. Impregnation of the coils is also an exceedingly complicated and expensive technique when manufacturing rotating electric machines today.

To sum up, thus, a rotating electric machine according to the invention means a considerable number of important advantages in relation to corresponding prior art machines. Firstly, it can be connected directly to a power network at all types of high voltage. High voltage in this respect voltages exceeding 10 kV and up to the voltage levels which occur for power networks. Another important advantage is that a chosen potential, for example earth potential, is consistently conducted along the whole winding, which means that the end winding region can be made compact and that support means at the end winding region can be applied at practically ground potential or any other chosen potential. Still another important advantage is that oil-based insulation and cooling systems disappear. This means that no sealing problems may arise and that the dielectric ring previously mentioned is not needed. One advantage is also that all forced cooling can be made at earth potential. A considerable space and weight saving from the installation point of view is obtained with a rotating electric machine according to the invention, since it replaces a previous installation design with both a machine and a step-up transformer. The invention requires no super-conducting rotor with the problems associated therewith, such as maintaining the temperature, encapsulation, and the like. Since a step-up transformer can be avoided, the efficiency of the system is considerably increased.

DESCRIPTION OF THE PREFERRED EMBODIMENTS

In order to manufacture a magnetic circuit in accordance with the description of the invention, the winding may be in the form of a conductor cable with an solid electrical insulation with a semiconducting layer both at the conductor and at the casing. Such cables are available as standard cables for other power engineering fields of use. Initially a short description of a standard cable will be given in which an embodiment is described. The inner current-carrying conductor comprises a number of non-insulated strands. Around the strands there is a semiconducting inner casing Around this semiconducting inner casing, there is an insulating layer of extruded insulation. An example of such an extruded insulation is XLPE or, alternatively, rubber such as silicone rubber, thermoplastic resins or crosslinked thermoplastic resins. This insulating layer is surrounded by an outer semiconducting layer which, in turn, is surrounded by a metal shield and a sheath. Such a cable will be referred to below as a power cable.

Figure 1:
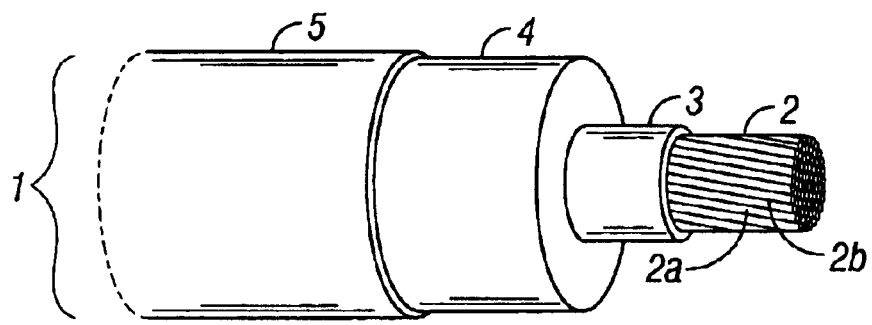
FIG. 1 shows the parts included in the current modified standard cable.

A cable intended as a winding in a rotating electric machine according to the invention is clear from FIG. 1. The cable 1 is described in the figure as comprising a current carrying conductor 2 which comprises transposed both non-insulated and insulated strands. Electromechanically transposed, extruded insulated strands are also possible. Around the conductor there is an inner semiconducting layer 3 which, in turn, is surrounded by an solid insulation part 9. This part is surrounded by an outer semiconducting layer 5. The cable used as a winding in the preferred embodiment has no metal shield and no external sheath. To avoid induced currents and losses associated therewith in the outer semiconductor, this is cut off, preferably in the end winding, that is, in the transitions from the sheet stack to the end windings. Each cut-off part is then connected to ground, whereby the outer semiconductor will be maintained at, or near, earth potential in the whole cable length. This means that, around the extruded insulated winding at the end windings, the contactable surfaces, and the surfaces which are dirty after some time of use, only have negligible potentials to earth, and they also cause negligible electric fields.

To optimize a rotating electric machine, the design of the magnetic circuit as regards the slots and the teeth, respectively, are of decisive importance. As mentioned above, the slots should connect as closely as possible to the casing of the coil sides. It is also desirable that the teeth at each radial level are as wide as possible. This is important to minimize the losses, the magnetization requirement, etc., of the machine.

Figure 2:
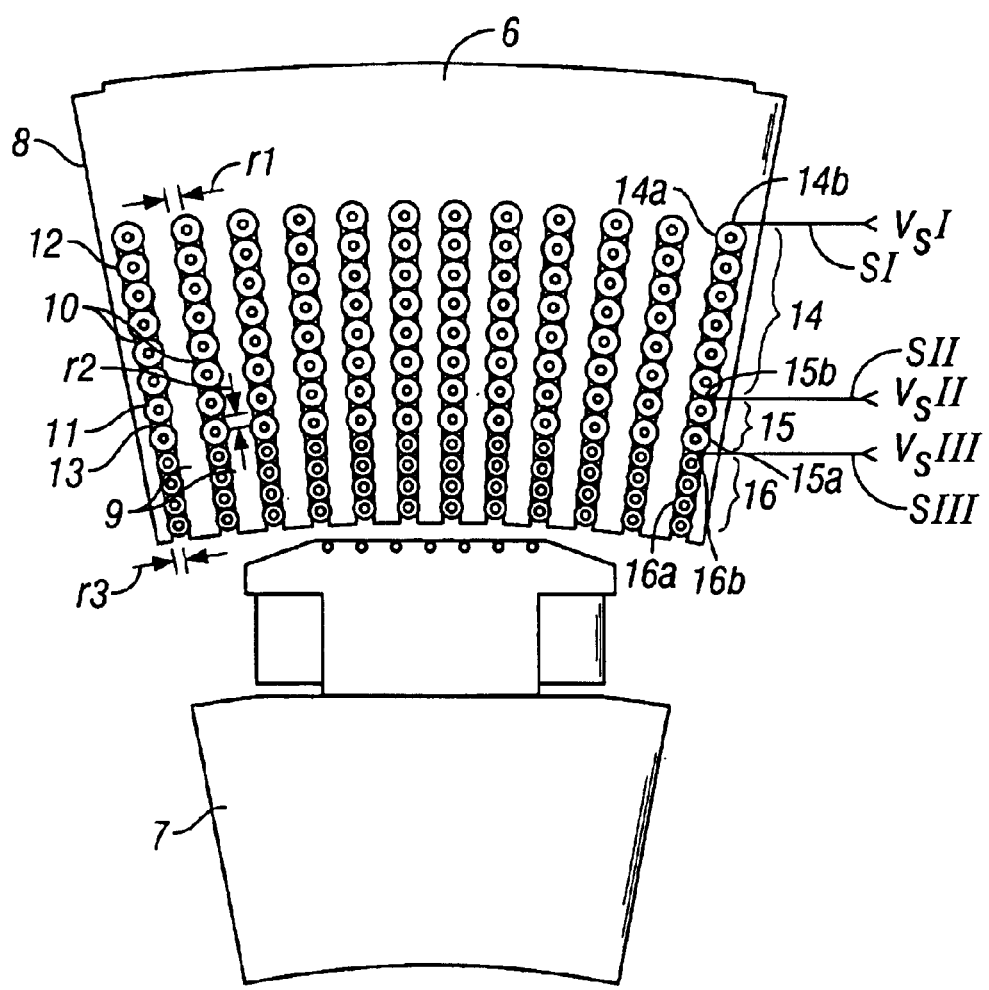
FIG. 2 shows an embodiment of an axial end view of a sector/pole pitch of a magnetic circuit according to the invention.

With access to a conductor according to claim 15 and, for example, the cable described above, there are great possibilities of being able to optimize the magnetic core from several points of view. In the following, a magnetic circuit in the stator of the rotating electric machine is referred to. FIG. 2 shows an embodiment of an axial end view of a sector/pole pitch 6 of a machine according to the invention. The rotor with the rotor pole is designated 7. In conventional manner, the stator is composed of a laminated core of electric sheets successively composed of sector shaped sheets. From a yoke portion 8 of the core, located at the radially outermost end, a number of teeth 9 extend radially inwards towards the rotor. Between the teeth there are a corresponding number of slots 10. The use of cables 11 according to the above among other things permits the depth o=the slots for high-voltage machines to be made larger than what is possible according to the state of the art. The slots have a cross section tapering towards the rotor since the need for cable insulation becomes less with for each winding layer towards the air gap. As is clear from the figure, the slot substantially consists of a circular cross section 12 around each layer of the winding with narrower waist portions 13 between the layers. With some justification, such a slot cross section may be referred to as a "cycle chain slot". In the embodiment shown in FIG. 2, cables with three different dimensions of the cable insulation are used, arranged in three correspondingly dimensioned sections 14, 15 and 16, that is, in practice a modified cycle chain slot will be obtained. The figure also shows that the stator tooth can be shaped with a practically constant radial width along the depth of the whole slot In an alternative embodiment, the cable which is used as a winding may be a conventional power cable' as the one described above. The earthing of the outer semiconducting shield then takes place by stripping the metal shield and the sheath of the cable at suitable locations.

The scope of the invention accommodates a large number of alternative embodiments, depending on the available cable dimensions as far as insulation and the outer semiconductor layer etc. are concerned. Also embodiuRents with so-called cycle chain slots can be modified in excess of kqhat has been described here.

As mentioned above, the magnetic circuit may be located in the stator and/or the rotor of the rotating electric machine. However, the design of the magnetic circuit will largely correspond to the above description independently of whether the magnetic circuit is located in the stator and/or the rotor.

As winding, a winding is preferably used which may be described as a multilayer, concentric cable winding. Such a winding implies that the number of crossings at the end windings has been minimized by placing all the coils within the same group radially outside one another. This also permits a simpler method for the manufacture and the threading of the stator winding in the different slots.

The invention is generally applicable to rotating electric machines for voltages 10 kV. Rotating electric machines according to what is described under the "Technical Field" are examples of rotating electric machines for which the invention is applicable.

What is claimed is:

1. A high-voltage rotating electric machine, comprising:
    a stator;
    a rotor opposing said stator; and
    a flexible high-voltage stator winding including
        a current-carrying conductor,
        an inner layer having semiconducting properties surrounding and being in electrical contact with said current-carrying conductor,
        a solid insulating layer surrounding and contacting the inner layer, and
        an outer layer having semiconducting properties surrounding and contacting the solid insulating layer; wherein said current-carrying conductor comprises a plurality of conductive elements, selected ones of said plurality of conductive elements being insulated from each other, and at least one of said plurality of conductive elements being uninsulated in order to electrically contact the inner layer.

2. A high-voltage rotating electric machine according to claim 1, wherein the inner layer has substantially a same potential as the conductor.

3. A high-voltage rotating electric machine according to claim 1, wherein the outer layer forms an equipotential surface surrounding the conductor.

4. A high-voltage rotating electric machine according to claim 1, wherein the outer semiconducting layer is connected to a node at a selected potential.

5. A high-voltage rotating electric machine according to claim 4, wherein the selected potential is earth potential.

6. A high-voltage rotating electric machine according to claim 1, wherein said high-voltage stator winding comprises separate windings and a separate potential is selected for each of said separate windings.

7. A high-voltage rotating electric machine according to claim 1, wherein at least one of said inner layer and said outer layer have substantially a same coefficient of thermal expansion as the solid insulating layer.

8. A high-voltage rotating electric machine according to claim 1, wherein the inner layer and the outer layer have respective inner and outer contact surfaces and are secured to the solid insulating layer along substantially an entire length of each corresponding contact surface.

9. A high-voltage rotating electric machine according to claim 1, wherein the stator comprises a laminated core.

10. A high-voltage rotating electric machine according to claim 1, wherein the stator has a plurality of radial slots having axial cylindrical openings, said slots and cylindrical openings having a substantially circular cross section separated by narrower waist portions between the cylindrical openings.

11. A high-voltage rotating electric machine according to claim 10, wherein the substantially circular cross section of the cylindrical openings are formed with a continuously decreasing radius as the slot radius decreases.

12. A high-voltage rotating electric machine according to claim 10, wherein the substantially circular cross section of the cylindrical openings are formed with a discontinuously decreasing radius as the slot radius decreases.

13. A high-voltage rotating electric machine according to claim 1, wherein the machine is operable at 100% overload for a period of time from about 15 minutes to about two hours.

14. A high-voltage rotating electric machine according to claim 1, wherein the machine is directly connectable to a power network without an intermediate transformer between the machine and the network.

15. A high-voltage rotating electric machine according to claim 1, further including means for controlling a magnetic field flow through the rotor.

16. A high-voltage rotating electric machine according to claim 1, being operable on a network without mechanical load for compensation of inductive or capacitive load on the network.

17. A high-voltage rotating electric machine having a magnetic circuit to a system voltage circuit, comprising:
    a magnetic core; and
    a flexible high-voltage winding including:
        a current carrying conductor having a plurality of conductive elements,
        an inner semiconducting layer surrounding the current carrying conductor and being in electrical contact with at least one of said plurality of conductive elements,
        an insulating layer of solid, extruded insulation surrounding and being in contact with the inner semiconducting layer, and
        an outer semiconducting layer surrounding and being in contact with the insulating layer: wherein said current-carrying conductor comprises a plurality of conductive elements, selected ones of said plurality of conductive elements being insulated from each other and at least one of said plurality of conductive elements being uninsulated in order to electrically contact the inner layer.

18. A high-voltage rotating electric machine according to claim 17 wherein the machine has a rotor and an opposed stator, and a magnetic circuit is arranged in at least one of the stator and the rotor.

19. A high-voltage rotating electric machine according to claim 17 wherein the outer semiconducting layer is severed at a plurality of locations forming a plurality of parts separately connectable to earth potential.

20. A high-voltage rotating electric machine according to claim 17, wherein the core comprises a conductive static core having slots for receiving the high-voltage winding and being in electrical contact with the outer semiconducting layer such that an electric field of the machine outside the outer semiconducting layer in the slots and in an end winding region is near zero.

21. A high-voltage rotating machine according to claim 17 wherein the conductive elements comprise a plurality of transposed conductors.

22. A high-voltage rotating electric machine, comprising:
a stator;
a rotor opposing the stator; and
a flexible high-voltage winding disposed in the stator including:
one or more current carrying conductors having a coil side and coil ends;
an electric field confining insulating system including,
an inner layer surrounding the one or more current-carrying conductors and being in electrical contact with at least one of the current-carrying conductors,
a solid insulating layer surrounding and being in contact with the inner layer, and
an outer layer surrounding and being in contact with the solid insulating layer, said inner layer and said outer layer having a sufficient conductivity to establish an equipotential surface surrounding the conductors along the coil side and in the coil ends: wherein said high voltage winding is selectively connectable to a plurality of system voltage levels.

23. A high-voltage rotating electric machine according to claim 22, wherein said high-voltage winding includes a plurality of separate tappings configured to connect to different system voltage levels.

24. A high-voltage rotating electric machine according to claim 22, including a plurality of windings connectable to a system voltage level for each separate winding.

25. A high-voltage rotating electric machine according to claim 22, including means for permitting exchange of electric energy between a plurality of electrical systems of different voltages.

26. A method of manufacturing a magnetic circuit for a rotating electric machine, the magnetic circuit being arranged in at least one of a stator and a rotor of the electric machine, the magnetic circuit including a magnetic core formed with slots configured to receive a winding formed from a high-voltage cable having a conductor, the slots being formed as cylindrical openings having a substantially circular cross section extending axially through the rotating electric machine and aligned in rows extending radially, comprising the steps of:
configuring the cable to be flexible including forming the high-voltage cable with an electric field confining outer covering surrounding the conductor, and forming the conductor of a plurality of conducive elements, insulating from each other selected ones of said plurality of conductive elements other, and wherein at least one of said plurality of conductive elements being uninsulated, and electrically contacting the at least one uninsulated conductive element with the inner layer
threading the high-voltage cable in the cylindrical openings.

27. A rotating high-voltage electric machine, comprising:
a stator,
a rotor; and
a flexible high-voltage winding including
at least one current-carrying conductor, and
an electric field confining cover surrounding the current-carrying conductor including
an inner layer surrounding and in electrical contact with the current-carrying conductor,
an insulating layer surrounding and in contact with the inner layer, and
an outermost layer surrounding and in contact with the insulating layer, said outermost layer having a conductivity for establishing an equipotential surface around the current-carrying conductor,
said current-carrying conductor comprises a plurality of conductive elements, selected ones of said plurality of conductive elements being insulated from each other and at least one of said plurality of conductive elements being uninsulated in order to electrically contact the inner layer, wherein
said high-voltage winding is configured to form at least a full uninterrupted turn in the winding of said machine.

28. The machine of claim 27, wherein the outermost layer is in electrical contact with the stator.

29. The machine of claim 27, wherein the inner and outermost layers have semiconducting properties.

30. The machine of claim 27, wherein the cover is formed of a plurality of layers including an insulating layer and wherein said plurality of layers are substantially free of cavities and pores.

31. The machine of claim 27, wherein the layers of the cover have substantially the same temperature coefficient of expansion.

32. The machine of claim 27, wherein the machine is operable at 100% overload for two hours.

33. The machine of claim 27, wherein of the cable is operable free of end winding loss.

34. The machine of claim 27, wherein the high-voltage winding is operable free of partial discharge and field control.

35. The machine of claim 27, wherein the high-voltage winding comprises multiple uninterrupted turns.

36. The machine of claim 27, wherein the high-voltage winding comprises a cable.

* * * * *